Figure 1:
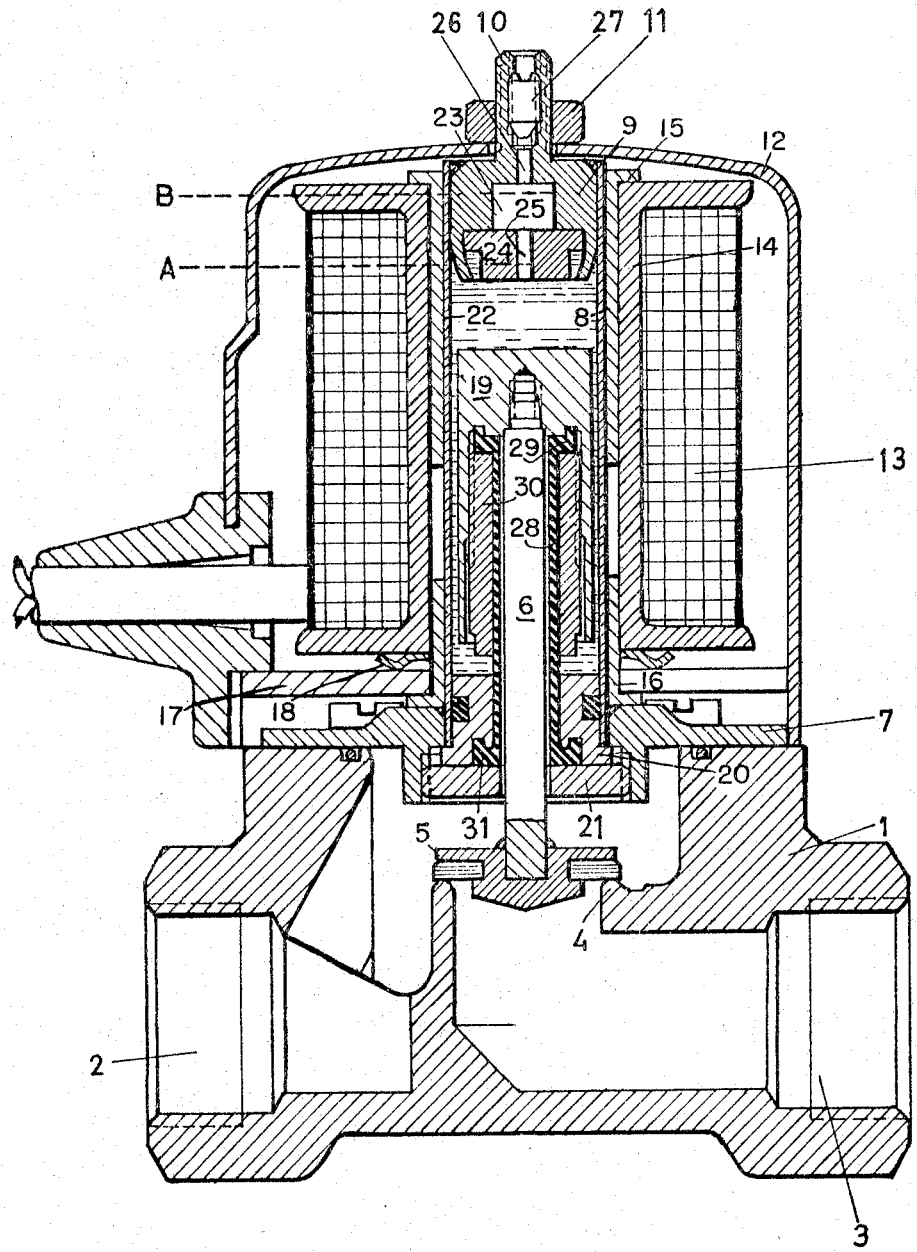

United States Patent Office 3,326,511
Patented June 20, 1967

3,326,511
MAGNETIC VALVE WITH DIAPHRAGM SEALED ARMATURE CYLINDER
Knud Hallgreen, Langesø, Nordborg, Denmark, assignor to Danfoss A/S, Nordborg, Denmark, a corporation of Denmark
Filed Oct. 5, 1964, Ser. No. 401,359
Claims priority, application Germany, Oct. 5, 1963, D 42,644, D 42,645
4 Claims. (Cl. 251—54)

The present invention relates to valves and particularly to magnetically operated valves provided with hydraulic damping. The hydraulic liquid not only provides controlled attenuation of the action of the valve, but also has the advantage of providing a sound proofing effect so that the valve operates more quietly.

The invention further relates to providing a fluid-tight seal between two parts which are axially slidable for a limited distance relative to one another, such as the valve stem and casing of a valve.

Heretofore, magnetic valves provided with hydraulic damping have been of a complicated design which differs so much from the design of undamped magnetic valves that the number of parts which could be used in both designs was very limited. In contrast with prior constructions, the damped magnetic valves in accordance with the present invention are sufficiently similar to undamped magnetic valves that many of the same parts can be used in assembling valves of both types. This reduces manufacturing costs and simplifies maintaining an inventory of parts. The valve in accordance with the invention has the further advantages of being compact in size and requiring only a small quantity of oil or other liquid for the hydraulic damping.

In accordance with the invention, the armature of the electro-magnet for actuating the valve is mounted directly on the valve stem thereby avoiding the more complicated rocker-lever design presently employed. Moreover, the armature on the valve stem operates in a cylinder filled with oil or other liquid so as to constitute a plunger or piston providing hydraulic damping of the valve.

Heretofore, it has been considered necessary for the oil chamber for hydraulic damping to be of constant volume. This leads to complications of construction. In accordance with the present invention, on the contrary, the volume of the oil chamber varies during the operation of the valve by reason of a greater or lesser portion of the valve stem extending into the hydraulic cylinder. The resulting variation of volume is accommodated by providing a reservoir to receive the excess liquid when the volume of the chamber or space is reduced. This reservoir is preferably vented above the maximum oil level by means of a throttling air vent. The reservoir preferably communicates with the hydraulic damping cylinder through a restricted passage providing a throttling effect which allows the oil to enter the reservoir only at a predetermined speed. This throttling action can be utilized to control the speed of operation of the valve and also avoids entry of oil into the reservoir at such speed as to be expelled through the venting device.

In order to prevent leakage of liquid from the hydraulic chamber and also prevent leakage of the line fluid around the valve stem, it is necessary to provide a fluid-tight seal between the stem and the closure member or guide through which the stem passes in going from the valve chamber into the hydraulic damping cylinder. The use of packing glands, O-rings and similar sealing devices is undesirable since they prevent free movement of the valve stem and are likely to leak if subjected to higher pressures or to long periods of wear.

Easy mobility of the two parts relative to one another can be achieved with a diaphragm-type seal comprising a flexible membrane having an inner periphery secured to one part and an outer periphery secured to the other. In order to permit sufficient movement, the diaphragm must be of substantial size. With such a sealing arrangement, the existing pressure conditions affect both sides of the membrane over a relatively large area. The forces resulting from such pressures interfere with the proper operation of the valve and may, in some instances, result in serious malfunctioning. In order to overcome such pressures on the diaphragm, it may be necessary to use a larger or stronger electro-magnet for operating the valve.

In accordance with the present invention, there is provided a sealing device which permits easy mobility between two parts which are axially movable relative to one another while providing a seal which is almost entirely independent from pressure conditions existing on opposite sides of the seal. In accordance with the present invention, the seal is provided by an elastic or flexible tube having flanged ends which are clamped respectively to the relatively movable parts. Thus, as applied to a valve, one flanged end of the tube is secured to the valve stem while the other is secured to the closure or guide through which the valve stem passes. Any pressure difference which exists on opposite sides of the sealing element act mainly in a radial direction and therefore, do not tend to move the parts relative to one another. Forces which act in an axial direction can be kept extremely small and can even be suppressed completely.

By way of example, if the surfaces between which the end flanges of the tube are clamped are brought up to the immediate proximity of the tube wall, the area on which pressure differences can act in an axial direction, is limited to the cross-sectional area of the tube wall. If the outer clamping surfaces overlap the ends of the tube so as to extend to the inner periphery of the tube, the axial forces acting on the tube can be reduced even more.

A further feature of the invention is that the sealing tube by being elastic can act as a return spring for moving the parts relative to one another in one direction while an outside force, for example an electro-magnetic force, may move them in the opposite direction. In most applications, it is recommended to design the tube as long as possible in order to provide a greater freedom of movement of the parts. Thus, the length of the tube should be greater than its diameter and preferably two or more times the diameter. When applied to an elongated member such as a valve stem or shaft, the sealing tube closely surrounds the member without, however, being sufficiently tight on it as to restrict its movement.

Figure 2:
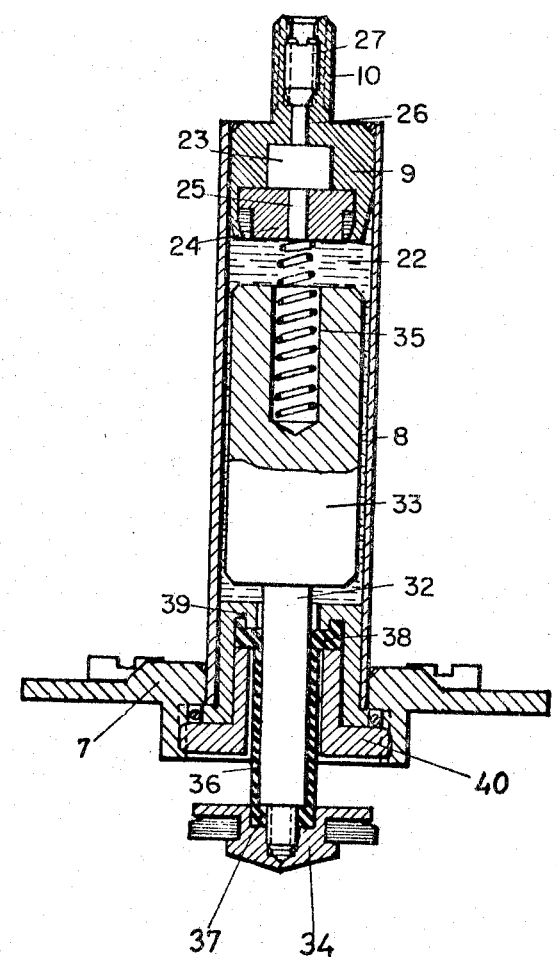

The invention will be more fully understood from the following description with reference to preferred embodiments shown by way of example in the drawings in which, FIG. 1 is a longitudinal sectional view through a magnetic valve embodying the present invention, and FIG. 2 is a partial longitudinal sectional view similar to a portion of FIG. 1 and showing another embodiment.

The electro-magnetic valve shown by way of example in FIG. 1 comprises a valve casing 1 having an inlet portion 2, an outlet portion 3 and an annular valve seat 4 located between the inlet and outlet. A valve member 5 having an annular valve washer 5a is adapted to seat on the valve seat 4 to close the valve and is rigidly connected with a valve stem or shaft 6. On its upper side, the valve casing is closed by a lid or cover 7 suitably secured to the valve casing, for example by stud bolts or screws (not shown), a fluid-tight joint being made by a sealing ring 7a. The cover 7 has a central opening into which the lower end of a cylindrical member 8 is inserted and soldered or otherwise secured to the cover. The cylinder 8 projects upwardly from the cover and is coaxial with the valve stem 6. The upper end of the cylinder 8 is closed by a magnet plug 9 secured in the cylinder, for example by soldering and provided with an upwardly projecting externally threaded stem portion 10. A cup-shaped cap 12 surrounds the cylinder 8 and is pressed onto the valve casing 1 by a nut 11 screwed onto the threaded stem portion 10 of the plug 9. A magnet coil 13 wound on a coil form 14 surrounds the cylinder 8 and is held in place by inserts 15 and 16, a spacing disc 17 and spacing washer 18. An armature 19 formed of magnetic material such as iron, is screwed onto the threaded upper end of the valve stem 6 and is slidable in an axial direction in the cylinder 8.

A guide plug 20 is inserted in the lower end of the cylinder 8 and is held in place by a lock screw 21 screwed into an internally threaded annular flange 7b of the cover 7. A rubber or other sealing ring 20a assures a fluid-tight joint. The space inside the cylinder 8 between the closure plug 9 and the guide plug 20 is filled with hydraulic liquid which for convenience and without limitation is herein referred to as oil 22. The magnet armature 19 acts as a piston dividing the space inside cylinder 8 into an upper chamber C1 and a lower chamber C2. Upon movement of the armature 19 in the cylinder 8, oil flows from one chamber to the other through a restricted passageway, thereby damping movement of the armature and corresponding movement of the valve stem 6 and valve member 5. The restricted passage between the chambers C1 and C2 may be provided by suitable throttling channels provided in the armature or in the cylinder, or as shown by way of example in the drawing, may be provided by providing a selected restricted clearance between the armature 19 and the inside wall of the cylinder 8.

When the armature 19 moves upwardly, the total space available for oil 22 in chambers C1 and C2 together is reduced by reason of the space now occupied by a portion of the valve stem 6 as the latter extends into the cylinder an increasing amount. Hence, the total volume of chambers C1 and C2 is not constant but varies in accordance with the position of the armature. For this reason, there is provided an expansion space or reservoir to accommodate the excess oil when the armature 19 is moved upwardly. As shown by way of example in the drawing, this reserve space is provided by a reservoir 23 provided in the magnet plug 9 and communicating with the space inside cylinder 8 through a throttling channel 25 formed in an insert 24.

The reservoir 23 is provided with a venting device comprising a throttling channel 26 regulated by a throttling screw 27. When the armature 19 is in its lower position as illustrated in FIG. 1, the oil has a minimum level indicated by the line A. When the armature is raised by the action of the magnet 13, the oil level rises to a maximum level indicated by the line B. The throttling action of the restricted channel 25 prevents the oil from entering reservoir 23 with such speed or force as to be thrown through the venting device 26 to the outside of the valve. Moreover, screw 27 is adjusted in such manner that air can enter or exit from the reservoir 23 at a predetermined speed without permitting the passage of oil. In this way, a faultless hydraulic damping operation can be achieved in spite of the fact that the volume of the space inside the armature cylinder 8 varies due to the entering of the valve shaft 6.

In order to provide a fluid-tight seal between the interior of cylinder 8 containing oil 22 and the valve chamber in casing 1 containing line fluid, a seal is provided between the guide plug 20 and the valve shaft 6.

As illustrated in FIG. 1, this seal comprises a tube-shaped sealing element 28 provided at opposite ends with outwardly projecting flanges 29 and 31. The tube 28 is formed of flexible and preferably elastic material such as natural or synthetic rubber. It closely surrounds the valve shaft 6 without, however, being sufficiently tight as to interfere with axial movement of the valve shaft. The upper flange 29 of the tube 28 is clamped between the upper end wall of an internally threaded annular recess formed in the lower end of the armature 19 and the upper end of a threaded sleeve 30 screwed into this recess. Thus, the sealing tube 28 extends a substantial distance up inside the armature 19 and is clamped near the upper end of the armature. The annular flange 31 at the lower end of tube 28 seats in an annular recess formed in the guide plug 20 and is clamped between the guide plug 20 and retaining nut 21. When the armature 19 is lifted by the action of the magnet coil 13, the sealing tube 28 is elongated and because of its elastic characteristics, acts as a return spring biasing the valve 5 toward closed position. The tube 28 thus serves a dual function. Its operation is improved by reason of the extra length provided by securing the upper flange 29 of the tube in the upper portion of the armature 19.

When the end flanges 29 and 31 of the sealing tube 28 extend outwardly as shown in FIG. 1, their inside and outside clamping surfaces are completely covered by the clamping parts 19, 30, 20 and 21. Hence, the sealing member 28 is not subjected to axial stress or strain by reason of differences in pressure in the valve chamber of casing 1 and the oil chamber in cylinder 8. Even if it were to be assumed that part of the pressure would affect the clamping surfaces of flanges 29 and 31 on account of insufficient clamping, the only area that would be affected would be that formed by the wall cross-section of tube 28. Hence, any forces would be very small.

In FIG. 2, there is shown only a portion of another embodiment in which like parts are designated by the same reference numerals as in FIG. 1. All omitted parts are in accordance with those illustrated in FIG. 1.

In the embodiment illustrated in FIG. 2, the valve shaft 32 is rigidly connected with the armature 33 and is screwed into an internally threaded recess in valve member 34. The valve is biased toward closed position by a compression spring 35 fitted into an axial recess in the upper end of the armature 33 and acting between the armature and the closure plug 9.

A sealing tube 36 formed of flexible and preferably elastic material such as a suitable rubber composition surrounds the valve shaft 32 and is provided at its lower end with an inturned annular flange 37 which is clamped between the valve member 34 and a shoulder on the valve shaft 32. At its upper end, the sealing tube 36 is provided with an outwardly projecting annular flange 38 which is clamped between a guide plug 39 and a bushing 40 screwed into an internally threaded annular recess in the cover 7 of the valve casing. Thus, the screw bushing 40 secures the guide plug 39 in position and also clamps the lower flange of the sealing tube.

The compression spring 35 presses the armature 33 towards its lower postion corresponding to closed position of the valve and thereby stretches the sealing tube 36 in an axial direction. The force exerted by the stretched tube therefore assists the opening movement of the valve when the magnet is excited. The comprission spring 35 and elastic tube 36 thus compensate one another. However, the spring 35 is sufficiently strong to produce seating of the valve when the electro-magnet is de-energized.

While a sealing tube as illustrated in FIGS. 1 and 2 is especially advantageous in hydraulic damped magnetic valves, it is also useful for other valves and other purposes where it is desired to effect a seal between axially movable parts subject to a pressure difference on opposite sides of the seal. While preferred embodiments of the invention have been illustrated in the drawings and particularly described, it will be understood that the invention is in no way limited to specific details of these embodiments.

What I claim is:

1. A magnetic valve comprising a casing defining an inlet and an outlet and a valve seat between said inlet and said outlet, a cylinder fixed relative to said casing in line with said valve seat, a movable valve member adapted to seat on said valve seat to close said valve, a valve stem fixed to said valve member and extending into said cylinder, a guide surrounding said valve stem, an armature fixed on said stem and slidable in said cylinder, said armature dividing said cylinder into two chambers connected by a restricted passageway, a magnet winding around said cylinder, means providing a fluid-tight seal around said stem between said armature and said valve member, said sealing means comprising a flexible tube closely surrounding said valve stem and having annular flanges at its opposite ends, said casing having a threaded opening through which said valve stem extends and in which a lock nut screwed into said threaded opening secures said guide in said opening and clamps said flange at one end of said tube between said lock nut and said guide, means securing said flange at the other end of said tube to said valve stem, said chambers containing liquid which flows from one said chamber to the other through said restricted passageway upon movement of said armature in said cylinder and thereby damps the movement of said armature and said valve member, and means providing an expansion space to accommodate liquid displaced by said valve stem.

2. A magnetic valve comprising a casing defining an inlet and an outlet and a valve seat between said inlet and said outlet, a cylinder fixed relative to said casing in line with said valve seat, a movable valve member adapted to seat on said valve seat to close said valve, a valve stem fixed to said valve member and extending into said cylinder, a guide surrounding said valve stem, an armature fixed on said stem and slidable in said cylinder, said armature dividing said cylinder into two chambers connected by a restricted passageway, a magnet winding around said cylinder, means providing a fluid-tight seal around said stem between said armature and said valve member, said sealing means comprising a flexible tube closely surrounding said valve stem and having annular flanges at its opposite ends, means securing said flange at one end of said tube to said guide, the end of said armature toward said valve seat being provided with an internally threaded axial recess surrounding said valve stem and said flange at the other end of the tube being clamped between said armature and a threaded sleeve screwed into said axial recess, said chambers containing liquid which flows from one said chamber to the other through said restricted passageway upon movement of said armature in said cylinder and thereby damps the movement of said armature and said valve member, and means providing an expansion space to accommodate liquid displaced by said valve stem.

3. A magnetic valve comprising a casing defining an inlet and an outlet and a valve stem between said inlet and said outlet, a cylinder fixed relative to said casing in line with said valve seat, a movable valve member adapted to seat on said valve seat to close said valve, a valve stem fixed to said valve member and extending into said cylinder, a guide surrounding said valve stem, an armature fixed on said stem and slidable in said cylinder, said armature dividing said cylinder into two chambers connected by a restricted passageway, a magnet winding around said cylinder, means providing a fluid-tight seal around said stem between said armature and said valve member, said sealing means comprising a flexible tube closely surrounding said valve stem and having annular flanges at its opposite ends, means securing said flange at one end of said tube to said guide, said flange at said other end of said tube projecting inwardly and being clamped between said valve stem and said valve member, said chambers containing liquid which flows from one said chamber to the other through said restricted passageway upon movement of said armature in said cylinder and thereby damps the movement of said armature and said valve member, and means providing an expansion space to accommodate liquid displaced by said valve stem.

4. A magnetic valve comprising a casing defining an inlet and an outlet and a valve seat between said inlet and outlet, a cylinder fixed relative to said casing in line with said valve seat, a movable valve member adapted to seat on said valve seat to close said valve, a valve stem fixed to said valve member and extending into said cylinder, an armature fixed on said stem and slidable in said cylinder, said armature dividing said cylinder into two chambers connected by a restricted passageway, a magnet winding around said cylinder, means providing a fluid-tight seal around said stem between said armature and said valve member, said chambers containing liquid which flows from one said chamber to the other through said restricted passageway upon movement of said armature in said cylinder and thereby damps the movement of said armature and said valve member, and means providing an expansion space to accommodate liquid displaced by said valve stem, said means providing an expansion space being provided with an air vent to permit the escape of air displaced from the expansion space by said liquid accommodated by the expansion space.

References Cited
UNITED STATES PATENTS

| | | | |
|---|---|---|---|
| 2,469,038 | 5/1949 | Winkler | 251—54 X |
| 2,652,848 | 9/1953 | Wick et al. | 251—54 X |
| 2,922,614 | 1/1960 | Nickells | 251—54 |
| 2,923,521 | 2/1960 | Ray | 251—54 |
| 3,098,635 | 7/1963 | Delaporte et al. | 251—54 |
| 3,157,831 | 11/1964 | Ray | 251—141 X |
| 3,159,774 | 12/1964 | Dube et al. | 251—54 X |

FOREIGN PATENTS

| | | |
|---|---|---|
| 1,317,894 | 1/1963 | France. |
| 1,185 | 5/1854 | Great Britain. |

M. CARY NELSON, *Primary Examiner.*

ARNOLD ROSENTHAL, *Examiner.*